United States Patent
Walther et al.

[11] Patent Number: 5,965,239
[45] Date of Patent: Oct. 12, 1999

[54] PLASTICS HOUSING

[75] Inventors: Bernd Walther, Bietigheim-Bissingen; Christof Heuberger, Vaihingen; Martin Csermak, Bietigheim-Bissingen; Hans-Peter Rienhardt, Neckarsulm, all of Germany

[73] Assignee: ITT Manufacturing Enterprises, Inc., Wilmington, Del.

[21] Appl. No.: 08/981,510

[22] PCT Filed: Jun. 19, 1996

[86] PCT No.: PCT/EP96/02662

§ 371 Date: Mar. 9, 1998

§ 102(e) Date: Mar. 9, 1998

[87] PCT Pub. No.: WO97/01467

PCT Pub. Date: Jan. 16, 1997

[51] Int. Cl.[6] .............................. B32B 23/02; B29C 33/40

[52] U.S. Cl. .......................... 428/192; 428/81; 428/157; 428/174; 264/219; 264/220

[58] Field of Search ..................................... 428/174, 100, 428/192, 33, 81, 99, 157; 264/219, 220, 241, 299

[56] References Cited

U.S. PATENT DOCUMENTS 4,885,948  12/1989  Thrasher et al. ........................... 74/425
5,099,717   3/1992  Ochiai et al. .......................... 74/606 R

FOREIGN PATENT DOCUMENTS

3722789  4/1988  Germany .

Primary Examiner—Donald Loney
Attorney, Agent, or Firm—J. Gordon Lewis

[57] ABSTRACT

A casing for a drive unit has a casing base body which is sealed by means of a cover unit. The casing base body consists of plastic, while the cover is produced from metal. It is desirable to form the edge of the casing in such a manner that the cover is supported on the casing base body in a flat manner. Since, within molding technology, there are a few difficulties in forming a continuous edge, a number of elevations, which serve as a support surface for the cover, jut out onto the edge of the cover. By means of a finishing of the casting mold, it can be achieved, in a simple manner, that the sealing surfaces of the elevations come to lie in one plane. The sealing of the casing cover relative to the casing base body is carried out by way of a sealing unit which is supported on the edge of the casing and leaves the elevations free.

4 Claims, 8 Drawing Sheets

PLASTICS HOUSING

BACKGROUND OF THE INVENTION

The invention relates to a casing of plastic, particularly for a drive unit with a depression, which is encircled by an edge onto which a metallic cover is placed.

In a number of cases of application—particularly if shafts or axes of the drive unit are supported on the cover—it is necessary for the cover to be able to be placed onto the casing aligned in a flat manner.

This causes a number of difficulties in forming the casting mold for a plastic casing in such a manner that the entire support border proceeds in a plane.

The invention thus relates to the object of forming a plastic casing, particularly for a drive unit, in such a manner that the cover is placed on the drive unit casing in a defined plane.

SUMMARY OF THE INVENTION

For this, it is proposed to provide individual elevations on the edge of the casing, on which elevations the cover is supported.

In order to now obtain a flat alignment of the cover, it is only necessary to bring the sealing surfaces of the elevations into a plane. The casting mold is, for that purpose, produced in the following manner. First of all, a plastic casing is produced with a temporary casting mold, with which casing the relative height of the elevations to one another are measured.

The casting mold is, in a manner corresponding to the differences which have been determined, finished at the corresponding points. The casting mold thus finished can serve as pattern for the further production of the casing.

A sealing unit, which leaves the elevations free and the thickness of which is somewhat greater than the height of the elevations over the edge of the casing, is placed on the edge of the casing. During the placing on of the cover, the sealing unit is squeezed together so that, in those areas in which the cover is not placed on the edge of the casing, the sealing unit ensures a clean sealing.

The elevations are preferably provided at the points at which the cover is connected with the casing by means of screw- or rivet connections.

The elevations preferably encircle the screw holes in the manner of a crescent.

BRIEF DESCRIPTION OF THE DRAWINGS

The construction of a motor drive unit for the wiper apparatus of a motor vehicle is described in the following. As is evident from the description, the essential elements of this apparatus can also be used for motor drive units which serve for other purposes of use.

The description is carried out in reference to 10 diagrams, which depict the following.

DETAILED DESCRIPTION OF THE DRAWINGS

Figure 1:
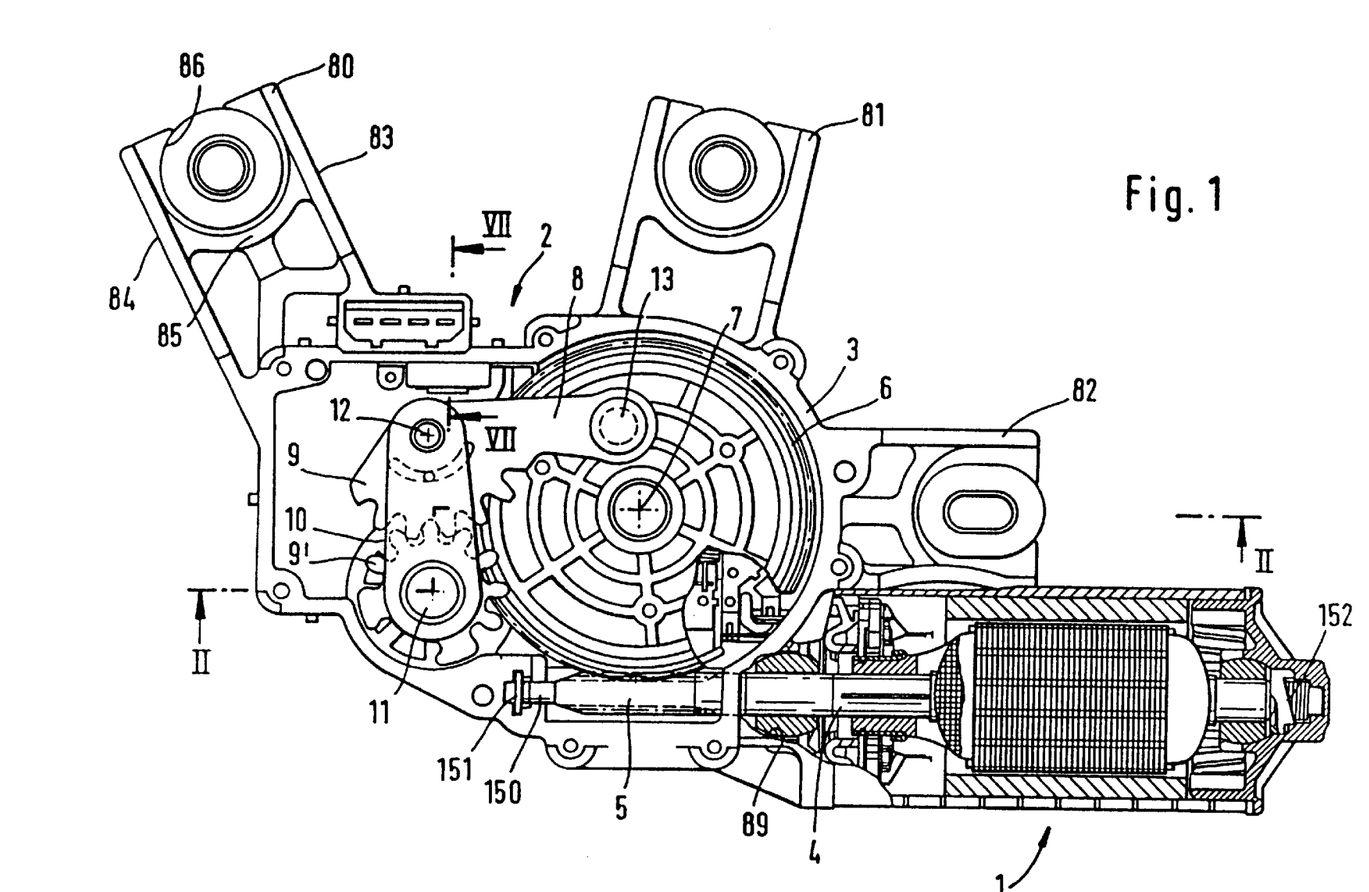
FIG. 1 depicts a motor drive unit without a drive cover, whereby the depiction is carried out, in part, in a view from above and, in part, in a cross-section.

Reference will first be made to FIG. 1.

The unit consists of an electrical motor 1 as well as a drive unit 2. The electrical motor 1 is attached laterally to the casing of the drive unit 3. The drive unit involves a so-called "pendulum drive unit".

This consists of the following elements: The motor shaft 4 is extended and supports, on its extended end, a helical unit 5. This meshes with a worm wheel 6. Eccentrically to the axis 7 of the worm wheel 6, a first lever 8 with a partial pinion 9 is connected with the worm wheel 6, in a swivelable manner, in the center of rotation 13. The partial pinion 9 engages with an additional partial pinion 9' on the drive shaft 11. One center of rotation 12 on the first lever 8 is linked to the drive shaft 11, by way of a second lever 10, in such a manner that the center of rotation 12 always moves on a partial radius around the axis of the drive shaft 11.

If the worm wheel 6 is driven by the motor during the maintenance of a given direction of rotation, the first lever 8 carries out, on the basis of its doubled articulation, a forced movement in the centers of rotation 12, 13, which leads to the drive shaft being moved back and forth. Nearly any angle of swiveling of the drive shaft 11 which is desired can be adjusted by means of a corresponding choice of the geometry of the partial pinion 9, 10, as well as of the articulation points 12, 13.

Figure 2:
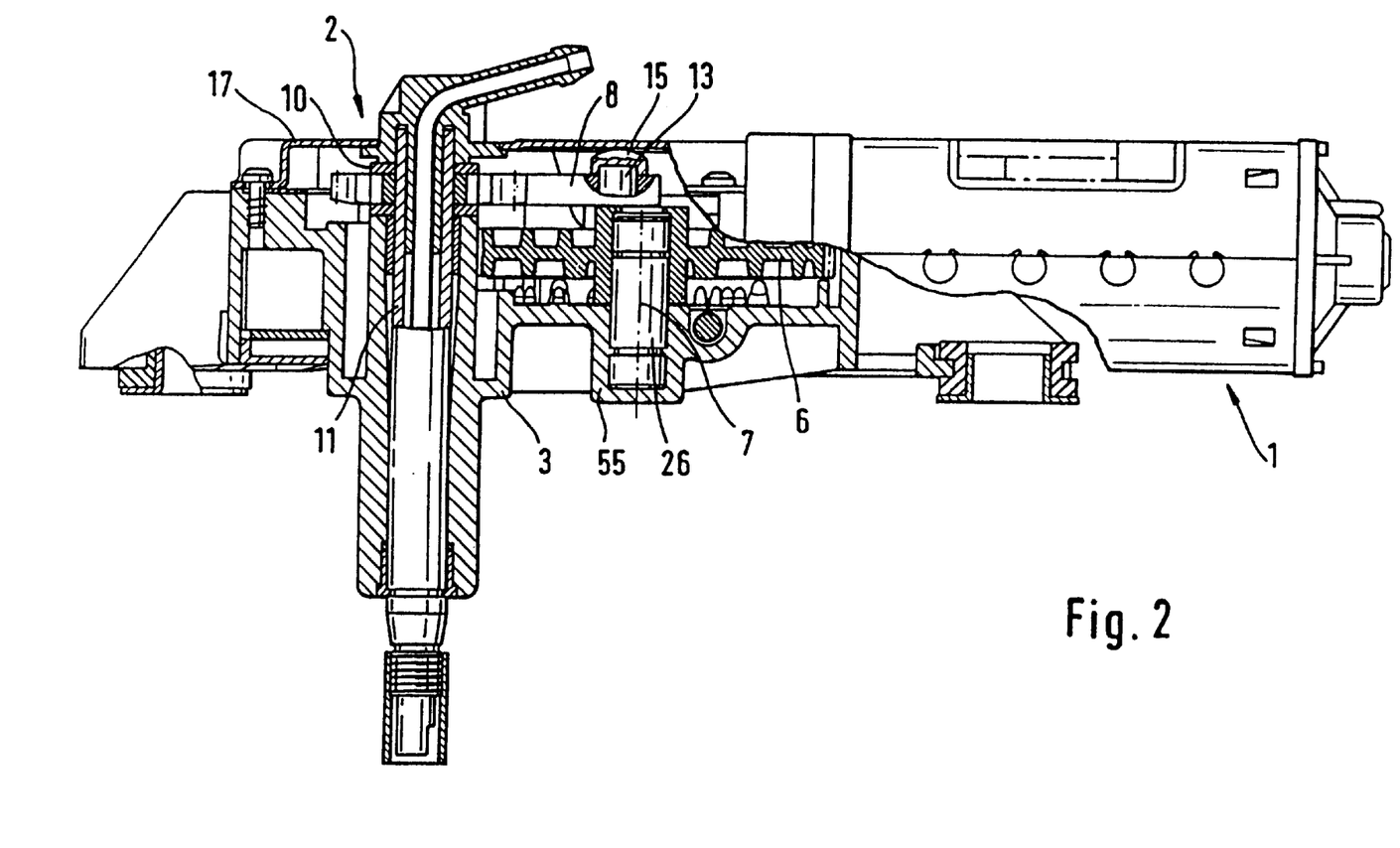
FIG. 2 depicts a section along the line II—II of FIG. 1.

As can be inferred, in particular, from FIG. 2, the axis of the center of rotation 13 projects somewhat over the first lever 8. A cap 15, which slides along on the lower side of the cover unit 17 of the drive unit casing 3, is placed on this end.

A drive unit casing 3, which consists of two parts, is provided for the accommodation of this drive unit. The first part consists of a base body 20 of plastic, which has several recesses. The largest recess serves for the accommodation of the worm wheel 6, so that the base body 20 is essentially shaped as a pan or trough. The open side of the base body 20 is sealed by means of the cover unit 17 of metal, which has already been mentioned, and which forms the second part of the drive unit casing.

The base body 20 now accommodates, in addition to the drive unit elements, additional elements which serve for the control of the motor. These are, in particular, an electronic unit 23 (see FIG. 5) and a contact plate 22 with contact lugs, which slide along the corresponding switching paths which are attached to the worm wheel 6.

Figure 3:
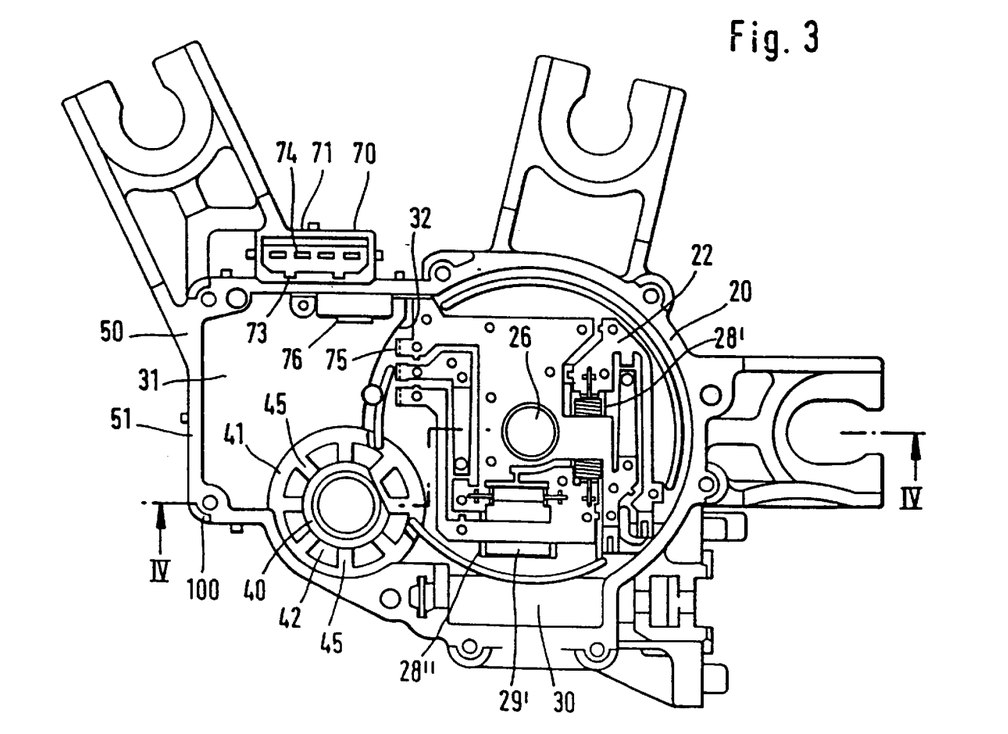
FIG. 3 depicts, in a view from above, the drive unit casing without cover unit, with a contact disk placed on the base of the casing.
Figure 4:
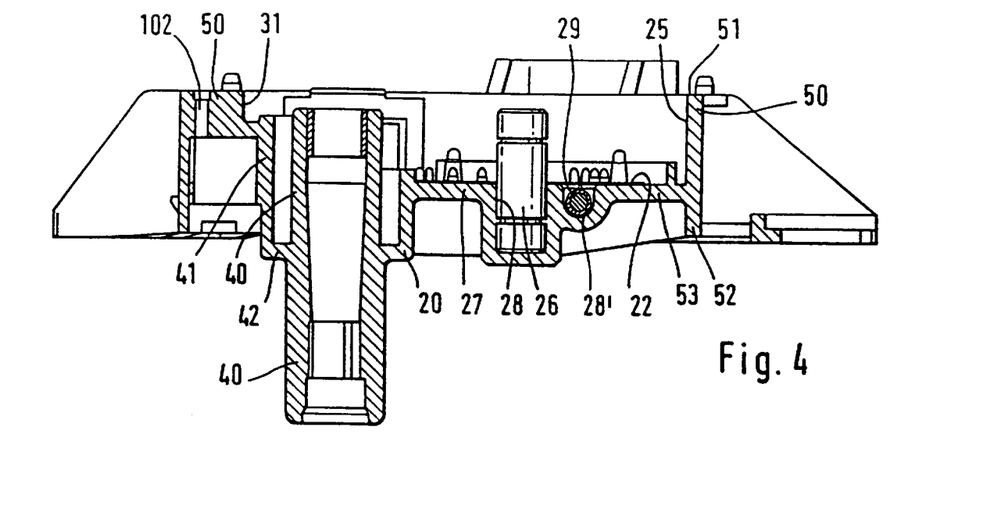
FIG. 4 depicts a section along the line IV—IV of FIG. 3.
Figure 5:
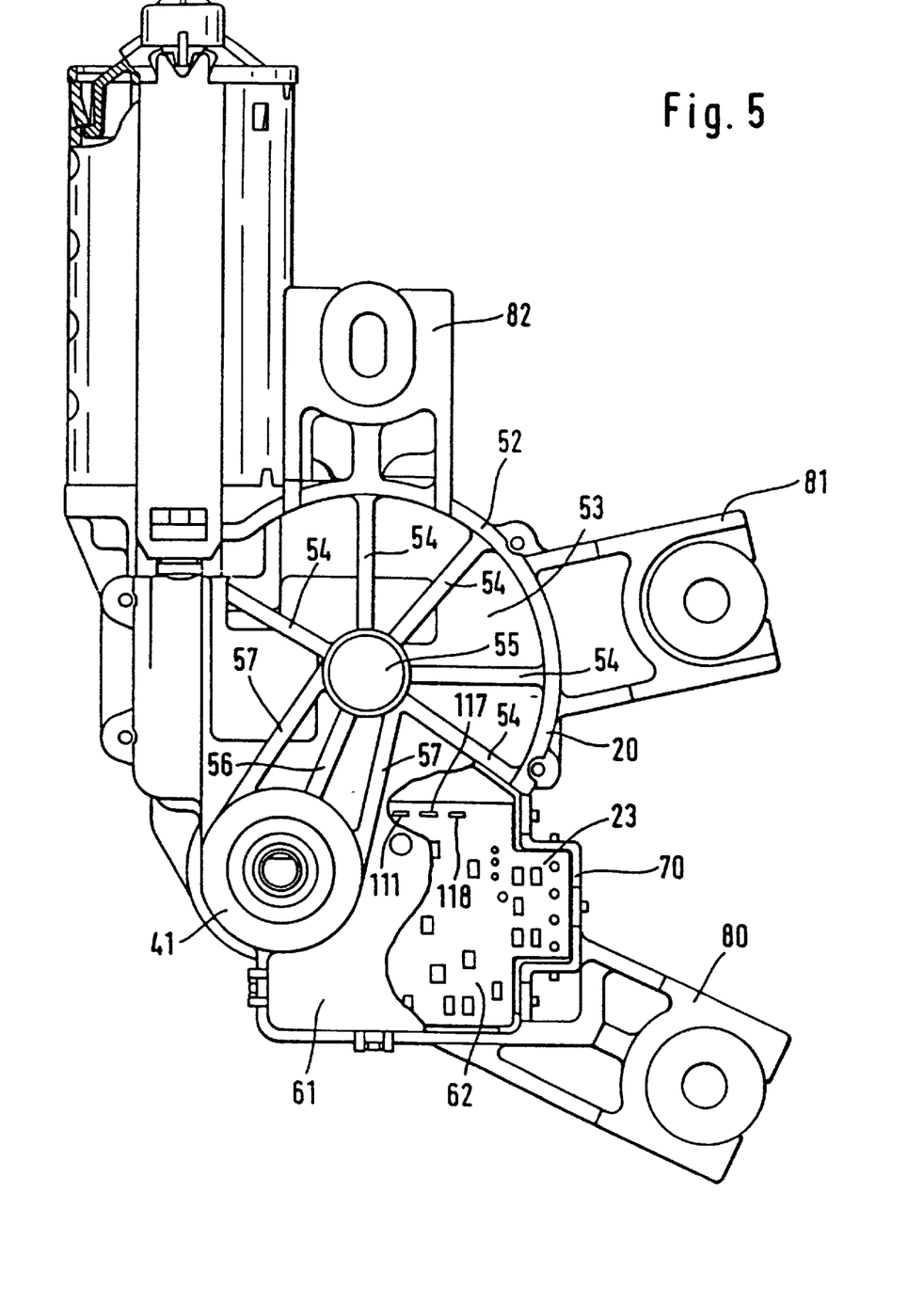
FIG. 5 depicts a view from the outside against the base of the drive unit casing, partially in a view from above and partially cut away, with an electronics unit inserted.

In order for these elements to be accommodated, additional chambers or recesses, which will be described in further detail in the following by means of FIGS. 3, 4 and 5, are provided in the base body 20. A first area serves for the accommodation of the worm wheel 6, and will thus be designated in the following as the gear chamber 25. It is circular, and has a depth which essentially corresponds to the height of the gear. As is to be inferred from FIG. 3, a contact plate 22 is inserted onto the base of the gear chamber in a laminar manner. A peg 26, which forms the axis of the worm wheel 6, is located In the center of the chamber. This peg is held in a corresponding depression 28 in the base 27 of the gear chamber.

The base has additional depressions 28', 28", into which a screening throttle 29 or a capacitor 29' are inserted, which are positioned on the lower side of the contact plate 22. A groove 30, within which the helical unit 5 is positioned on the extended motor shaft 4, is joined to the gear chamber 25. For the passage of the shaft, a penetrating aperture, which ends in the flange for the electrical motor 1, is connected to the groove 30 in the axial direction. In order for the helical unit 5 and the worm wheel 6 to enter into contact, the groove 30 is open to the gear chamber 25. A swiveling area 31 which, as is clearly to be inferred from FIG. 1, serves to create possibilities for swiveling for the first and second lever arm 8, 10, is located on an additional side of the gear chamber 25, displaced by about 90 degrees to the groove 30 and turned away by the flange of the electrical motor.

This area 31 is bounded on the outside in an approximately square manner, the base is flat, and its depth is significantly less than that of the gear chamber 25, so that a stage 32 is present between the gear chamber 25 and the swiveling area 31.

For the accommodation of a bearing sleeve 40, a pot-shaped mounting dome 41 is provided in connection with the swiveling area 31, as well as the gear chamber 25. The edge of the mounting dome 41 begins at approximately the height of the base of the swiveling area 31. The base 42 of the mounting dome 41 is distinctly below the base of the gear chamber 25. Because the external contour of the dome 41 projects, in part, into the gear chamber 25, the wall of the dome is cut away in this area. The bearing sleeve 40, which begins at the level of the base of the swiveling area 31, projects through the base 42 of the dome 41, and extends beyond the same, is located in the center of the dome. Between the internal wall of the dome and the external wall of the bearing sleeve 40, reinforcement struts 45 extend over the entire height of the dome. The struts are partially cut away, specifically, in the area which extends into the gear chamber 25.

The stated areas: gear chamber 25, groove 30, swiveling area 31, as well as the dome 41—are encircled by an edge 50, the upper border of which proceeds at the same height and serves as a support surface 51 for the metal cover 17 and a sealing unit which is inserted, if necessary, between the edge and the cover unit.

As is to be inferred from FIGS. 4 and 5, the edge 50 has been guided, in part, up to a point below the base of the individual areas. It can be seen in FIG. 5 that the lower edge area 52 encloses the lower side of the base 53 of the gear chamber 25 by approx. 180 degrees. From this lower edge area 52, which is extended over the lower side of the base, four rib units 54 proceed to a central socket 55, which likewise projects out from the lower side of the base 53 and serves, as is to be noted from FIG. 2, for the accommodation of the peg 26.

It can be noted that the base socket 55 ends in approximately the same height as the base 42 of the dome 41. Three reinforcement struts proceed between the socket 55 and the dome 41: the central rib unit 56 proceeds from the center of the socket 55 to the axis of the dome 41, and two side rib units 57 proceed, each tangentially, into the socket 55 or into the dome 41.

This arrangement of the rib units was selected because it is necessary for the peg 26, and therefore the axis of rotation of the worm wheel 6 as well as the axis of the drive shaft 11, to remain aligned as precisely to one another as possible, in order to prevent noises during the operation of the motor. In order to achieve the rigidity which is necessary for that purpose, the socket 55 was not connected directly to the bearing sleeve 40, but through the insertion of the dome 41, with a diameter which is expanded relative to the bearing sleeve 40. Possible deformations can be better absorbed by the rib units 56, 57. The bearing sleeve 40 itself is held in the dome unit 41 by means of the reinforcement struts 45.

The edge 50 is also drawn downwards into the area of the swiveling area 31, so that a reception chamber 60, which serves for the accommodation of an electronic control device, is formed on the side turned away from the swiveling area 31. This can be noted particularly well in FIG. 5, in which a cover unit 61, which seals this chamber, is partially cut away, so that a plate 62 to which electronic switching elements are applied can be noted. The reception chamber 60 is bounded, on the one hand, by the edge which is drawn downwards, as well as by one of the rib units 54 and one lateral rib unit 57.

A plug casing 70 is integrally formed with the lateral wall of the swiveling area 31 or the reception chamber 60, which proceeds tangentially into the wall of the gear chamber 25. The plug casing involves a rectangular casing 71, which is open at the top and bottom. The casing 71 is divided into two areas by a separating wall 72, which proceeds in parallel to both of the open sides. The one area is open to the upper side of the casing and serves for the guidance of a plug unit, for which the internal side of the casing is provided with corresponding guide grooves 73. The other area of the casing, which is open to the lower side of the casing 3, is additionally open to the reception chamber 60, so that the plate 62 can project into this area of the casing. Four pins, which project through penetrating apertures 74 in the separating wall into the first area of the plug casing 70, and can be brought into connection there with the corresponding contacts of the counter-plug, are soldered to the plate.

Three penetrating apertures 75, which penetrate into the reception area 60, are likewise provided in the area of the base of the gear chamber 25. Contact brackets 111, 117, 118 of the contact plate 22 project through these penetrating apertures 75.

One additional penetrating aperture 76 proceeds from the reception area 60, through the base of the swiveling area 31, into the swiveling area. The significance of this will be described in further detail below in connection with the explanation of the contact plate 22.

As is to be noted in FIGS. 1 to 4, three attachment elements 80, 81 and 82 are positioned on the external side of the casing. These attachment elements can, in principle, be provided on every point of the casing, depending on how the installation situation in the vehicle requires this. The attachment elements 80, 81 and 82 each consist of a base socket with two side walls 83, 84 proceeding in parallel, which have the shape of a right-angled triangle. One cathetus of the triangle has a length which corresponds to the height of the casing 3 and connects with the casing 3. The other cathetus thereby extends perpendicularly from the wall of the casing. The side walls 83, 84 form a surface 85 between themselves which has an attachment eyelet 86 at the external end. The other part of the surface can, insofar as its rigidity allows this, be cut through. The attachment elements 80, 81, 82 can each be positioned in such a manner that the eye unit 86 either proceeds at the height of the casing cover 17, or at the height of the lower side of the casing 3, or centrally.

Figure 6:
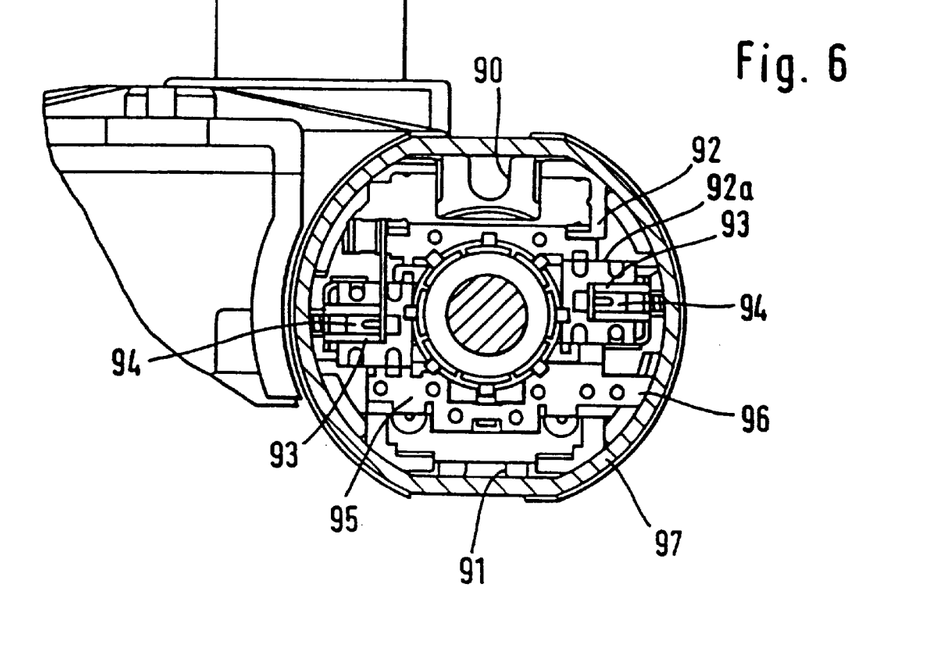
FIG. 6 depicts a view from above of the brush supporting plate of the electrical motor.

Reference will be made in the following to FIG. 6. The area in which the electrical motor is flange-mounted has a depression 89 for the accommodation of a support for the motor shaft 4. In addition, depressions 90, 91, with which the attachment hooks, by means of which the motor casing 92 is attached to the casing, engage, are provided above and below the flange area. A brush support plate 92a of plastic, which is provided with corresponding guide channels 93 for the brushes 94 of the electrical motor, can either be placed on the flange surface, or else be already constructed in advance from the outset as a single unit with the casing 3. A correspondingly-folded holding plate 95, which can be connected with the contact plate 22 on the base of the casing 3, is provided for the provision of power to the brushes 94 or for holding the brushes 94 in the corresponding guide channels 93 in the brush support plate 92. In addition, a penetrating aperture passes through the flange surface to the gear chamber 25. Blades units 96, which engage through this penetrating aperture and can be soldered to the contact plate, are provided on the holding plate 95. The holding plate additionally has a blade unit 96 which can be placed against the metallic casing mantle 97 of the electrical motor.

The elements noted above, which form the casing, are formed from a piece of plastic and produced by means of injection molding. In order to achieve the necessary rigidity, the plastic contains mineral fibers between 2 mm and 10 mm long. It contains, in addition, additives which make the plastic resistant against the influences of weathering (ozone) and confer sliding characteristics upon it, in order for the drive shaft to be supported directly in the guide casing.

Attention must be paid in the design of the base body 20 that an equal wall thickness is, to the greatest extent possible, present in all areas.

This has the result, first of all, that the areas in the base of the gear chamber 25 which accommodate the throttle and the capacitor appear as corresponding convexities on the lower side of the base 53.

Furthermore, the bearing sleeve 40, insofar as this projects outwardly out from the dome 41, is thickened. This corresponds to a facing sheath which is turned up which, in the previous casings, which were not produced from plastic, was inverted over the bearing sleeve which is visible on the outside of the vehicle. Through the fact that the entire casing is produced from plastic, a separate facing can be dispensed with. It should be noted that this generally presupposes that, as has already been explained, the plastic consists of weathering-resistant material.

The upper edge of the base body 20 is, as has already been explained, constructed in a flat manner, so that the cover unit 17 can be placed on there. Since, as is explained further below, the cover unit 17 also serves as a flexible support for the drive unit (cap unit 15), an increased demand is to be placed on the evenness of the surface of the upper boundary of the edge.

In order to achieve this, the injection mold must be refinished for long enough until, in regard to the slight deformations which arise during the cooling off of the casing after the removal out of the mold, a flat edge surface arises. Such a type of refinishing is extremely difficult. The following way is, therefore, proposed (see FIG. 8).

Figure 8:
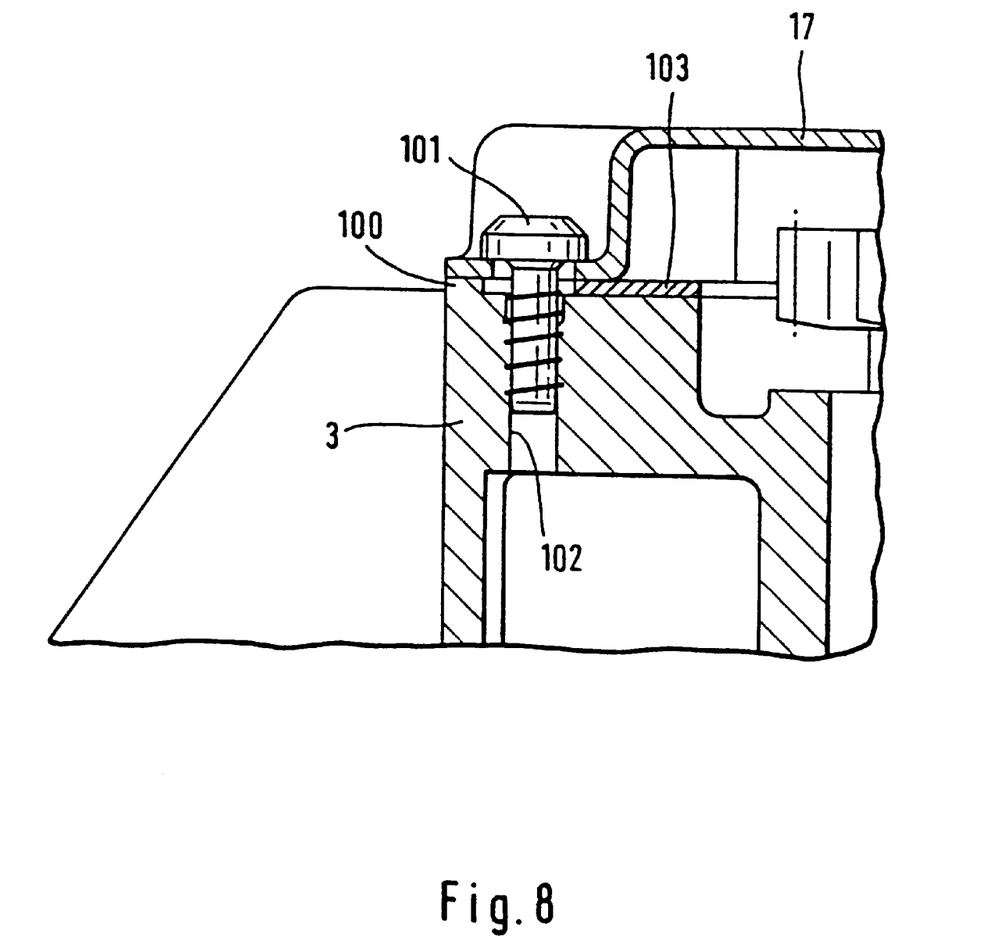
FIG. 8 depicts a detail of FIG. 2.

The casing 3 is connected to several points with screws 101, the allotted screw holes 102 of which are positioned on the edge of the casing. Elevations 100, which enclose the screw hole over a graduated circle of the lateral surface of the casing 3, are located on the edge, next to the screw holes 102. The height of the elevation is slightly less than the height of the sealing unit 103 which is used between the casing 3 and the casing cover 17.

The individual elevations 100 can easily be brought to the same height since, after a first injection molding and after the cooling off of the casing, the individual elevations 100 are measured, and the casting mold is refinished in a corresponding manner so that the elevations are all at the same height in the casings which are produced subsequently. Since the measurements are carried out at defined points, specifically at the elevations 100, the finishing of the mold can be carried out more easily, since it must only take place anew at the corresponding points of the mold. This is simpler than if it were attempted to make the entire edge surface flat.

The sealing unit 103 itself is flexible, so that, if the cover is screwed onto the casing, the sealing unit 103 is pressed downwards far enough until the cover 17 is supported on the elevations 100.

Figure 9A:
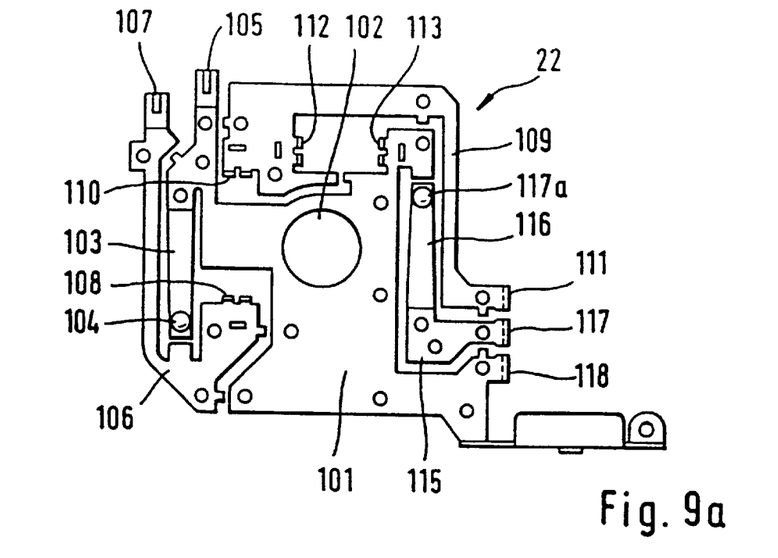
FIGS. 9a, 9b depict the contact plate which is inserted into the casing.
Figure 9B:
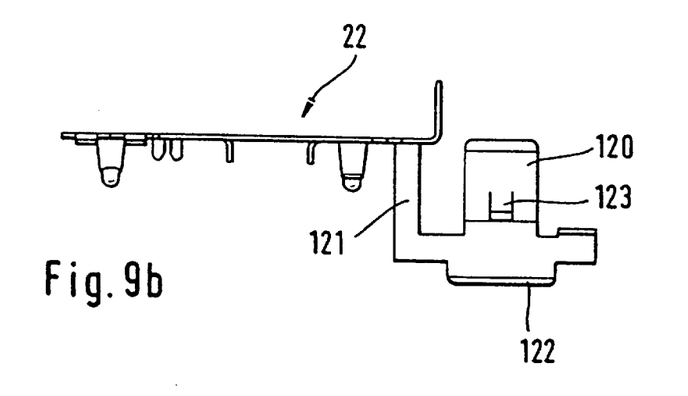

The contact plate 22, which is depicted in FIGS. 9-a and 9-b, will be described in the following. The contact plate 22 is stamped out of a metal sheet, whereby support bars, which are cut through after the placing of the contact plate 22 into the casing 3, still remain between the individual conducting strips. The primary conducting strip 101 has a central penetrating aperture 102 which, as soon as the contact plate 22 is supported on the base of the gear chamber 25, projects through the peg 26 for the worm wheel 6. A contact spring 103, which is bent out of the plane of the contact plate and has an elevated contact 104 at its end, which cooperates with a corresponding conducting strip on the lower side of the worm wheel, corresponds to the primary strip. It has, in addition, a contact lug 105 which is located in the outer area of the contact plate 22.

One additional conducting strip 106 proceeds approximately parallel to the contact spring 103 and supports, on its end, a second contact lug 107 as well as, at its other end, a connecting part 108 for the throttle 28. A third conducting strip 109, which proceeds on the external side of the contact plate in an "L"-shape, has, on its one end, an accommodation mount 110 for the other end of the throttle 28 and ends, on the other end, in a first contact pin 111.

This third conducting strip 109 has an additional connection 112 for the capacitor 29, the other end of which connects with a connection 113 on the primary conducting strip 101. A fourth conducting strip 115 is provided with a contact spring 116 which, just like the first contact spring 103, is provided, on its end which is bent upwardly, with a contact 117a which cooperates, in an additional conducting strip, with the lower side of the worm wheel 6. The other end of this conducting strip 116 likewise ends in a second contact pin 117b, which is positioned next to the first contact pin 111. A third contact point 118 is located on the primary conducting strip 101. The three contact points 111, 117, 118 are positioned next to one another.

The primary conducting strip 101 is connected, as a single part, with a cooling plate 120. This extends perpendicularly to the primary conducting strip 101 and is connected with the same by means of an "L"-shaped, upwardly-bent connecting part 121. The upper end of the cooling plate 120 is bent back and forms a contact surface 122 for the cover 17 of the casing. A bracket 123 is stamped out and bent outwardly in the surface of the cooling plate 120.

If the contact plate 22 is placed on the base of the gear chamber, then both contact lugs 105, 107 are located directly in front of the penetrating aperture in the flange for the electrical motor. The brush support plate 95 has two bent-back blades which extend through this penetrating aperture and contact the contact lugs 105 and 107. The contact pins 111, 117, 118 project through the penetrating aperture 75 in the base of the gear chamber 25 and extend into the area of the electronics mount 60. The corresponding pins are thus also noted in FIG. 5.

The cooling plate 120 projects through the penetrating aperture 76 in the base of the swiveling area 31, so that the lower end can come in contact with the units of the electronic unit which are to be cooled.

The upper, bent-back end is then located at the height of the sealing edge of the casing, so that the bent-back bracket 122 is in contact with the cover 17.

As has already been explained, the plate 62 of the electronic unit has several contact points which project into the plug casing 70. This has been depicted yet again, in cross-section, in FIG. 7. The figure depicts a section through the casing in the area of the plug casing 70 and the electronics mount 60, or of the swiveling area.

Figure 7:
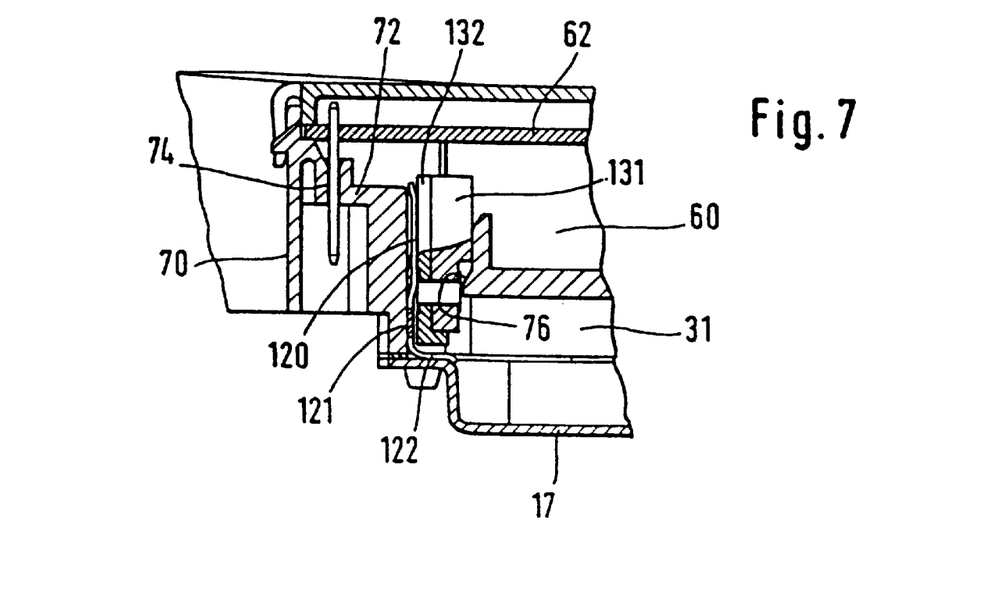
FIG. 7 depicts a section through the casing along the line VII—VII of FIG. 1.

The plate 62, to which a power transistor 131, among other items, is soldered on, is positioned in the electronics mount 60. A cooling clamp 132 is connected with the power transistor 131. The transistor 131 and the cooling clamp 132 project through the penetrating aperture 76 in the base of the swiveling area 31, whereby the cooling clamp 132 is placed close to the cooling plate 120 in a surface manner. The outwardly-bent bracket 121 ensures that it is supported on the wall of the casing, since the cooling bracket 120 is placed close to the cooling clamp 132 in an areal manner. It is to be noted, in addition, that the bent-back end 122 is placed close to the cover 17. The cover 17 thereby serves to cool the power transistor 131 over a large surface area.

As can also be noted in FIG. 7, and has already been explained, the plate 62 has several connecting pins which project into the plug casing 70. The contact pins 111, 117, 118 of the contact plate 22, which project into the accommodation area 60, are likewise connected with the plate 62 by means of corresponding conducting strips. One of these conducting strips connects the contact pin 118 to the primary conducting strip 101 with the ground connection pin in the plug casing 70. A contact spring 103 is not only thereby brought into connection with the ground, but also the brush which is contact with the contact plug 105. Moreover, the cover is connected with the ground by way of the cooling plate and the bent-back end 122. In addition, it is ensured that, during the formation of the brush support plates, the area which is placed in connection with the ground is brought into contact with the casing of the electrical motor, which is flange-mounted with the casing 3. All of the metallic parts are, insofar as they do not serve for the conducting of voltage, thereby brought into contact with the ground. The electrical motor can, as the result, easily be screened.

The second contact spring 116 is supplied with current by way of the second contact pin 117, while the second brush, which is in contact with the contact lug 107, is supplied with voltage by way of the throttle, by way of the first contact pin 111, through the third conducting strip 109, which is connected with the ground by way of the capacitor.

In this concept, the entire provision of power of the electrical motor, of the switch, which is formed by the contact springs 103, 116, as well as the conducting strips on the lower side of the worm wheel, as well as the electronic unit, are supplied with voltage by way of the contact plate, which voltage is supplied by way of a single plug unit. No additional wiring outside of the casing is necessary.

Figure 10:
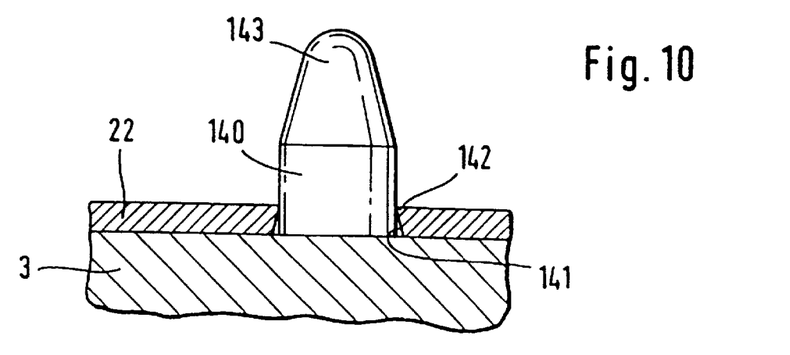
FIG. 10 depicts one possibility for the attachment of the contact plate in the casing.

The following proposal is made for the attachment of the contact plate on the base of the casing (see, in addition, FIG. 10).

Usually casing pegs 140 which correspond with corresponding holes in the plate, project out from the base of the casing. Insofar as the plate has been inserted, the peg projects out over the surface of the plate, so that it can now be pressed down with a heat stamp in a melting method, whereby a mushroom-shaped structure, which holds the plate in a secure manner, is brought about.

Since, as has already been explained, the plastic is interspersed with fibers, this method simply can not be used, since the fibers themselves do not take part in the deformation.

The hole 141 is thus formed in the plate in a conical manner, so that a relatively sharp edge 142 is brought about on the one side of the plate, while a broad opening is brought about on the other side. The diameter of the upper side of the opening—thus, at that place where the sharp edge is formed—is somewhat smaller than the diameter of the peg.

If the plate is now pressed onto the pegs 140, these project through holes, whereby the sharp edge 142 engages, in the manner of a barb, with the casing surface of the peg 140, so that the plate 22 can not be removed again. A durable connection of the plate 22 with the casing is thereby brought about.

In order to facilitate the alignment of the plate before the insertion, the upper ends 143 of the pegs are constructed in a conically proceeding manner.

One additional detailed solution is to be noted in FIG. 1. The shaft 4 of the motor proceeds into an end peg 150, against which a flat insert part 151 of metal is placed. This insert part 151 is inserted into a corresponding groove in the base body 20.

Since the shaft is held under pre-stressing by means of a corresponding device 152, frictional heat is brought about between the end peg 150 and the contact disk 151. Since the groove is open at the top, the contact disk 151, which is provided, if necessary, with a bent-back bracket, can come into contact with the cover 17. The cover 17 thereby serves for the dissipation of the frictional heat which is brought about. The contact disk 151 can, preferably, be configured in an oval shape, whereby the longitudinal side is inserted into the groove which is open at the top.

Attachment of the peg 26 in the base of the casing: In order to achieve a secure attachment, the peg 26 is first of all provided with one or more circular grooves. In addition, the peg is also extrusion-coated during the injection molding of the casing. In this way, the peg is securely held in the base of the casing.

As is depicted in FIG. 2, the peg can be provided on the one end, in a manner symmetrical to the groove, with an additional groove at the other end, so that the orientation of the peg does not need to be taken into consideration during the loading of the injection molding machine.

Since the drive unit which has been described above is also to be used for a windshield wiping and washing apparatus, a water supply is provided by way of the drive shaft 11. This is represented in further detail in FIG. 11. The drive shaft 11 is, for this purpose, constructed in a hollow manner. The feed line essentially consists of a brass tubelet 200, which is bent back at one end. This bent-back area is encircled by a holding part 201 of plastic, which is sprayed around the tubelet. The holding part 201 has, first of all, a guide part 202, which is inserted into the hollow shaft and which centers the tubelet 200. The other end is constructed as a nozzle 203 onto which a tube can be slipped. The base body 204 is provided with undercuts, by means of which this can be inserted into an opening in the cover 17 in the manner of a bayonet unit. The other end of the tubelet 200 is provided with a sealing part 205 which serves, at the same time, as a carrier unit for a metallic nozzle 206. In addition, the sealing part 205 has a recess into which the nozzle 206, the external contour of which is spherical, can be pressed. The nozzle 206 can now be aligned with the sealing part 205, so that the washing water strikes the windshield within a defined area. The sealing part is itself provided with a central blind hole 207, which ends in the accommodating area of the nozzle and into which the nozzle boring 208 discharges.

Figure 11:
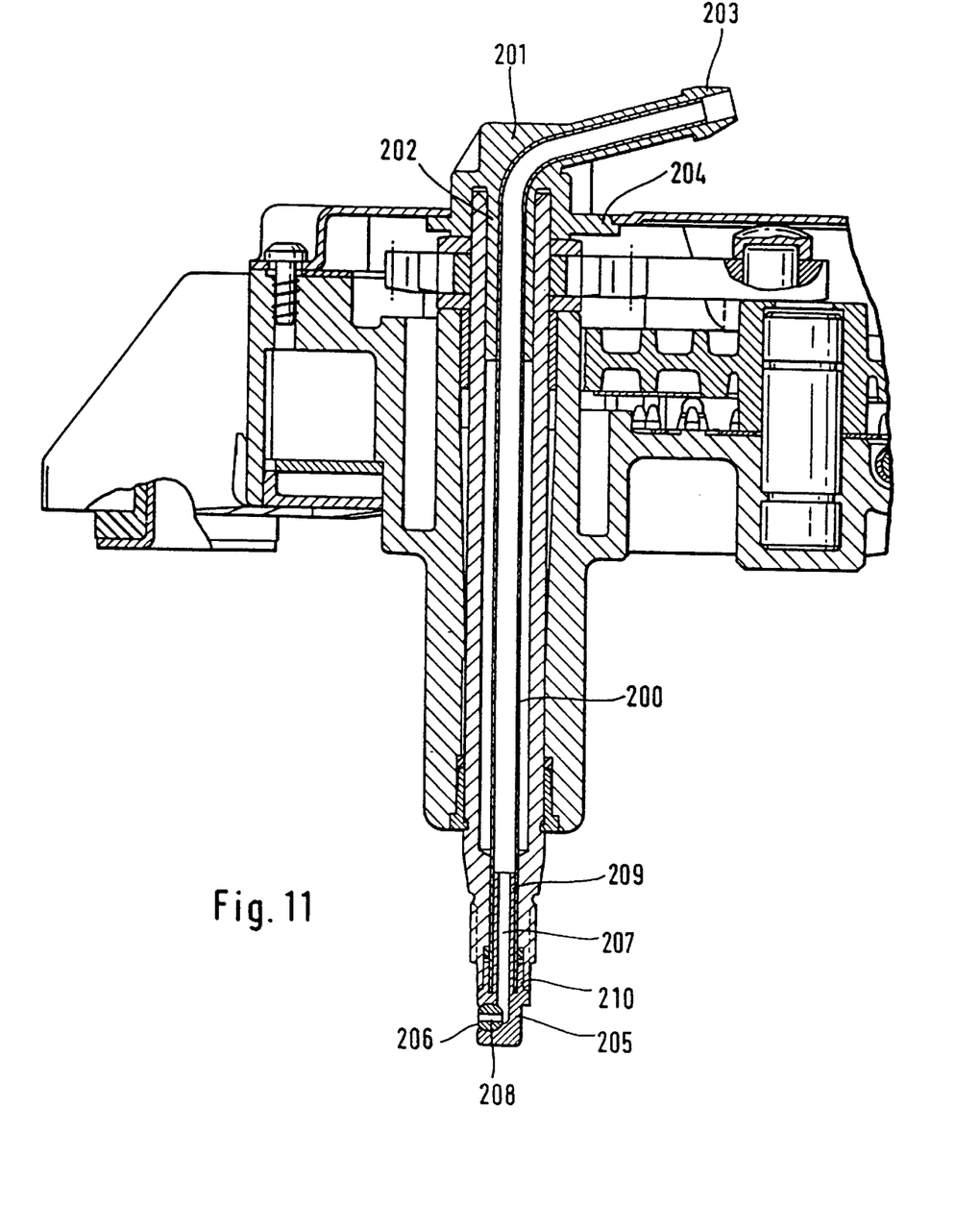
FIG. 11 depicts individual details of the passage of water through the drive shaft.

The problem now consists of securely attaching the sealing part 205 to the tubelet 200 in such a manner that the position of the sealing part itself is not changed during an adjustment of the nozzle 206.

In addition, the sealing part 205 has a guide peg 209 which can be inserted into the metallic tubelet 200, whereby the external diameter of the peg 209 approximately corresponds to the internal diameter of the tubelet. The fit must not, in any event, be too narrow, so that the tubular peg 209 can be inserted into the tubelet without bending.

In order to achieve a torsional securing of the seal 205 to the tubelet, a ring-shaped stud 210, which is positioned coaxially to the tube-shaped peg 209, so that an annular groove arises between the stud 210 and the tube-shaped peg 209, the width of which groove corresponds to the thickness of the wall of the tube, is additionally provided. If the end of the tubelet is roughened or milled, or if the coarseness of the surface is slightly increased in any manner on its external side, then the tubelet is seated, with sufficient clamping force, in the annular groove between the stud 210 and the peg 209.

The axial length of the stud 210 is determined in such a manner that a sufficient clamping force can be produced. The length of the tube-shaped peg 209 is determined in such a manner that a sufficient tightness of the support unit 205 relative to the tubelet is brought about.

List of references
001 Electrical motor
002 Drive unit
003 Drive unit casing
004 Motor shaft
005 Helical unit
006 Worm wheel
007 Axle
008 First lever
009 Partial pinion
009' Partial pinion
010 Second lever
011 Drive shaft
012 Center of rotation
013 Center of rotation
015 Cap
017 Cover unit
020 Base body
022 Contact plate
023 Electronic unit
026 Peg
027 Base
028 Depression
029 Screening throttle
029' Capacitor
030 Groove
031 Swiveling range
032 Stage
040 Bearing sleeve
041 Mounting dome
042 Base
045 Reinforcement strut
050 Edge
051 Support surface
052 Lower edge area
053 Base
055 Base socket
054 Rib units
060 Reception chamber
061 Cover
062 Plate
070 Plug casing
071 Casing
072 Separating wall
073 Guide groove
074 Penetrating apertures
075 Penetrating apertures
076 Penetrating aperture
080 Attaching element
081 Attaching element
082 Attaching element
083 Side wall
084 Side wall
085 Surface
086 Attachment eyelets
090 Depression
091 Depression
092 Motor casing
092-A Brush support plate
093 Guide channels
094 Brush
095 Holding plate
096 Blade
097 Casing mantle
101 Primary conducting strip
102 Penetrating aperture
103 Contact spring
104 Contact
105 Contact lug
106 Conducting strip
107 Contact lug
108 Connecting part
109 Third conducting strip
110 Mount
111 Contact pin
112 Connection
113 Connection
115 Conducting strip
116 Contact blade
117-A Contact
117-B Contact pin
118 Contact pin
120 Cooling plate
121 Connecting part
122 Contact surface
123 Bracket
131 Power transistor
132 Cooling clamp
140 Casing peg
141 Hole
142 Edge
143 End
150 End peg
151 Insert part
152 Device
200 Brass tubelet
201 Holding part
202 Guide part
203 Nozzle 204 Base body
205 Sealing part
206 Metal nozzle
207 Blind hole
208 Nozzle boring
209 Guide peg
210 Stud

We claim:

1. A plastic casing with a depression, comprising:
   an edge with several elevations encircling said depression for receiving a cover to be placed thereon;
   screwed or riveted connections for connecting the cover to the casing; and
   a seal engageable on the edge while leaving the elevations free to directly contact the cover and having a thickness slightly larger than a height of the elevations, wherein to each screwed or riveted connection, one elevation is assigned.

2. The plastic casing of claim 1, wherein the screwed or riveted connections each include an aperture which is partially encircled by an elevation.

3. The plastic casing of claim 2, wherein the apertures are encircled by the elevations in a crescent shape.

4. A process for producing a casting mold for a casing, wherein, at first, a plastic casing with elevations is produced with a temporary casting mold, in which casing a difference between a relative height of each of the elevations one to another are measured, whereupon the casting mold is finished to equalize points corresponding to the measured elevations, and wherein the casting mold thus finished serves as pattern for the further production of casings.

* * * * *